(12) United States Patent
Stephenson et al.

(10) Patent No.: US 6,346,197 B1
(45) Date of Patent: Feb. 12, 2002

(54) WATER AND WASTEWATER TREATMENT SYSTEM AND PROCESS FOR CONTAMINANT REMOVAL

(75) Inventors: Robert J. Stephenson, Vancouver; Bruce D. Tennant; Donald Hartle, both of North Vancouver, all of (CA)

(73) Assignee: McKay Creek Technologies Ltd., North Vancouver (CA)

(*) Notice: Subject to any disclaimer, the term of this patent is extended or adjusted under 35 U.S.C. 154(b) by 0 days.

(21) Appl. No.: 09/494,219

(22) Filed: Jan. 28, 2000

(51) Int. Cl.[7] .............................. C02F 1/24; C02F 4/63; C02F 4/65

(52) U.S. Cl. ....................... 210/704; 210/718; 210/726; 210/748; 210/750; 210/752; 210/787; 210/803; 210/804; 210/806; 210/195.1; 210/196; 210/197; 210/199; 210/202; 210/203; 210/205; 210/252; 210/260; 210/295; 204/242; 204/275; 205/751; 205/755

(58) Field of Search ................................. 210/703, 704, 210/712, 713, 718, 723, 726, 738, 748, 750, 752, 765, 767, 787, 790, 800, 803, 804, 805, 806, 194, 195.1, 196, 197, 199, 201, 202, 203, 205, 252, 258, 259, 260, 294, 295, 314, 525; 204/242, 275; 205/742, 751, 755

(56) References Cited

U.S. PATENT DOCUMENTS

| | | |
|---|---|---|
| 831,434 A | 9/1906 | Hinkson |
| 1,069,169 A | 8/1913 | Parker |
| 1,541,947 A | 6/1925 | Hartman et al. |

(List continued on next page.)

FOREIGN PATENT DOCUMENTS

| | | |
|---|---|---|
| EP | 0794157 B1 | 5/2000 |
| FR | 2707282 A1 | 1/1995 |
| WO | WO 90/15025 A1 | 12/1990 |
| WO | WO 99/26887 A1 | 6/1999 |

OTHER PUBLICATIONS

PCT/CA 01/00087, International Search Report, date Aug. 2, 2001.

Derwent World Patent Index and INPADOC records for FR 2707282 A1.

Primary Examiner—David A. Simmons
Assistant Examiner—Betsey Morrison Hoey
(74) Attorney, Agent, or Firm—Morrison & Foerster LLP; Todd W. Wight (57) ABSTRACT

A system and process for removing contaminants from water and wastewater, where the water or wastewater is transformed into purified water that can be discharged to the environment. Wastewater is transported through several stations for purification, including an electrochemical cell. The purification process begins by sending the wastewater to a classifier through an in-line basket strainer. The wastewater stream in the classifier is drawn through a solid-liquid hydrocyclone, which returns the solids to the classifier and sends the remaining liquid to feed tanks. Contaminants that float are removed from the wastewater by skimming from the surface of the feed tank. The wastewater underflow from the feed tanks is pumped directly to the electrochemical cell where it enters into the bottom of the cell, and exits from the top of the cell. The discharge, including coagulated solids, hydrogen gas, and oxygen gas, is mixed with a polymer as well as compressed air just prior to entering a static in-line mixer. The resulting mixture flows past a vertical vent pipe to a flotation cell. The underflow of the flotation cell, which is substantially free of coagulated solids, flows by gravity to a settling tank where any remaining solids sink to the bottom. The solid-free liquid (water) exits the settling tank over an overflow weir and is pumped through a plurality of bag filters and finally through a polymeric filter to remove remaining contaminants.

81 Claims, 3 Drawing Sheets

U.S. PATENT DOCUMENTS

| | | |
|---|---|---|
| 1,674,364 A | 6/1928 | Hartman |
| 2,154,948 A | 4/1939 | Lyons |
| 3,523,891 A | 8/1970 | Mehl |
| 3,679,556 A | 7/1972 | Doevenspeck |
| 3,692,661 A | 9/1972 | Shockcor |
| 3,849,281 A | 11/1974 | Bennett et al. |
| 3,944,478 A | 3/1976 | Kuji et al. |
| 3,959,131 A | 5/1976 | Ramirez et al. |
| 3,969,203 A | 7/1976 | Ramirez |
| 3,975,269 A | 8/1976 | Ramirez |
| 4,031,006 A | 6/1977 | Ramirez et al. |
| 4,129,494 A | 12/1978 | Norman |
| 4,149,953 A | 4/1979 | Rojo |
| 4,336,141 A | 6/1982 | Santora |
| 4,392,937 A | 7/1983 | Schmitt et al. |
| 4,495,048 A | 1/1985 | Murakami et al. |
| 4,714,534 A | 12/1987 | Fair et al. |
| 4,851,123 A | 7/1989 | Mishra |
| 4,917,782 A | 4/1990 | Davies |
| 5,062,940 A | 11/1991 | Davies |
| 5,093,006 A | 3/1992 | Kalnins |
| 5,271,814 A | 12/1993 | Metzler |
| 5,292,405 A | 3/1994 | Wicks |
| 5,320,718 A | 6/1994 | Molter et al. |
| 5,423,962 A | 6/1995 | Herbst |
| 5,425,858 A | 6/1995 | Farmer |
| 5,466,367 A | 11/1995 | Coate et al. |
| 5,531,865 A | 7/1996 | Cole |
| 5,536,389 A | 7/1996 | La Naour et al. |
| 5,549,812 A | 8/1996 | Witt |
| 5,587,057 A | 12/1996 | Metzler et al. |
| 5,611,907 A | 3/1997 | Herbst et al. |
| 5,746,904 A | 5/1998 | Lee |
| 5,783,089 A | 7/1998 | Anderson et al. |
| 5,928,493 A * | 7/1999 | Morkovsky et al. |

\* cited by examiner

WATER AND WASTEWATER TREATMENT SYSTEM AND PROCESS FOR CONTAMINANT REMOVAL

BACKGROUND OF THE INVENTION

1. Field of the Invention

The present invention relates generally to the field of water and wastewater treatment systems, and more particularly to systems utilizing an electrochemical cell to facilitate flocculation of particles in the water or wastewater to permit the discharge of treated wastewater to the environment or purification of potable water.

2. Description of Related Art

Contamination occurring in aqueous-based solutions has become a serious concern to society. In particular, problems associated with the disposal of industrial wastewater have been mounting. Disposing of the wastewater is not only very expensive and time consuming, but also extremely harmful to the environment. Some areas of concern in the disposal of wastewater, which are particularly suited to treatment using the subject system, are:

- removal of emulsified oils, both petroleum hydrocarbons and food base oils;
- partially dissolved contaminants which add to turbidity and color of water;
- negatively charged metals such as arsenic, molybdenum, and chromium;
- positively charged heavy metals such as copper, cadmium, nickel, lead, and zinc;
- contaminants such as ammonia, mercury, arsenic and iron which react with oxygen;
- contaminants which react with aluminum or iron such as chlorinated organics; and
- poorly settling TSS (total suspended solids) such as silt, ink, wood extractives, clay and microorganisms.

One example of a particular contaminant of concern is petroleum hydrocarbon contaminants in shipyard wastewater, including the oily wastewater resulting from cleaning out ship bilges and fuel tanks. The primary concern with this wastewater is finding an effective method for its disposal. While various methods have been developed to deal with this oily waste, none have been entirely successful given the extremely varied nature and content of the contaminants in the water, with oil content ranging anywhere from 0.5% to 50% in volume. Included among the methods attempting to control these waste streams are a wide variety of chemical and physical procedures.

Chemical procedures have attempted to cause a predetermined reaction between chemical additives and impurities contained within the waste stream. The most common reactions are designed to cause the impurities and the chemical additives to coagulate, wherein the particles increase in size and then separate by either floating on or settling below the treated water. The most popular chemical utilized is alum, which when added to the wastewater, separates much of the waste out of the water. There are several problems with chemical coagulation in general, including the generation of very large quantities of residuals that need to be disposed of and imprecision because the amount of chemical necessary for a given volume must always be estimated due to the varying nature of the waste streams.

Physical procedures are designed to achieve similar results as chemical additive procedures, but to a lesser degree of purity in the final aqueous solution. Filters, centrifuges, plate separators, and clarifiers are the most common physical procedures employed to remove contaminants from aqueous solutions. In most cases, the impurities that are removed physically are suspended solids or poorly emulsified contaminants.

While the chemical and physical procedures of treating waste streams were thought to be adequate at one time, the results of disposal of solutions treated in this manner have been disastrous. Oceans, streams, lakes and underground wells have all fallen victim to the contamination resulting from the impurities that were not removed by these methods. In fact, because of the dumping of contaminated solutions, many rivers and streams are considered waste sites and entire lakes have been drained so that the lakebeds can be hauled away to be treated as hazardous waste. The main problem is that regardless of whether chemical procedures, physical procedures, or a combination of the two are utilized, the content of impurities in the wastewater remains in an unacceptable range.

While it was known that the purification of waste streams, and in particular the coagulation of contaminants without the addition of chemicals, could be accomplished through electrolytic treatment in a process called electrocoagulation, the wide range of contaminants, varying contaminant concentrations and large and variable volumes of wastewater in the industrial waste streams generally discouraged its use. However, patents directed to electrolytic treatment apparatuses, methods and systems can be found dating back to the early part of this century. Electrocoagulation is the process of de-stabilizing suspended, emulsified or dissolved contaminants in an aqueous medium by introducing an electrical current into the medium. Electrocoagulation generally takes place inside a substantially sealed treatment chamber, where the impurities are coagulated out of the aqueous medium.

Many other systems and cells have been disclosed and patented, each trying to convert contaminated water to purified water by separating the contaminants from the water. Unfortunately, none of these systems have been able to solve the problems of variability, number and concentration of contaminants associated with the treatment of industrial wastewater. These previous systems created large quantities of metal sludge and other contaminant sludge that added to the cost of disposal. Even systems that were able to overcome these problems had other problems such as high labor cost (batch and dump methods); large areas necessary for increased residence time, and high capital costs due to electrical power and maintenance (on-line electrical systems); and low efficiency (dilution with non-conductive materials). Other systems suffered from design problems such as not accounting for the production of generated gases or the build up of impurities onto the working electrodes, or creating an electrolytic cell that is too complex and which cannot be easily maintained.

Accordingly, there is a need for a wastewater treatment system and process that removes contaminants, such as petroleum hydrocarbons, resulting in a product with impurities of considerably less than 15 parts per million (PPM), that is cost effective, energy conscious, easy to use and easy to maintain.

SUMMARY OF THE INVENTION

The present invention is directed to a treatment for water and wastewater and a process for removal of contaminants by utilizing chemical, mechanical, and electrolytic devices.

It is an object of this invention to provide a treatment system and process of removal that removes impurities from water and wastewater.

It is also an object of this invention to provide a treatment system and process of removal of contaminants from wastewater that is cost effective and energy efficient.

It is a further object of this invention to provide a treatment system and process of removal of contaminants from water and wastewater that is easy to use and easy to maintain.

In general, the subject invention has potential application to treat water and wastewater rather than using chemical methods such as inorganic cationic coagulants including the salts of aluminum (aluminum sulfate or "alum", aluminum chloride, or poly aluminum chloride), iron (chlorides or sulfates), or calcium (chlorides or sulfates). In addition, sediments may be removed in the preparation of potable water. The subject invention may also be used as an aid to clarify water following biological treatment of wastewater.

A more complete understanding of the waste water treatment system and process for the removal of contaminants will be afforded to those skilled in the art, as well as a realization of additional advantages and objects thereof, by a consideration of the following detailed description of the preferred embodiments. Reference will be made to the appended sheets of drawings, which will first be described briefly.

DETAILED DESCRIPTION OF THE PREFERRED EMBODIMENTS

The present invention satisfies the need for a water and wastewater treatment and contaminant removal process that is efficient and effective to purify water or to produce disposable water from industrial wastewater. This is accomplished by using a novel system and process of contaminant removal that includes an electrochemical cell for the coagulation of organic and inorganic materials.

Figure 1:
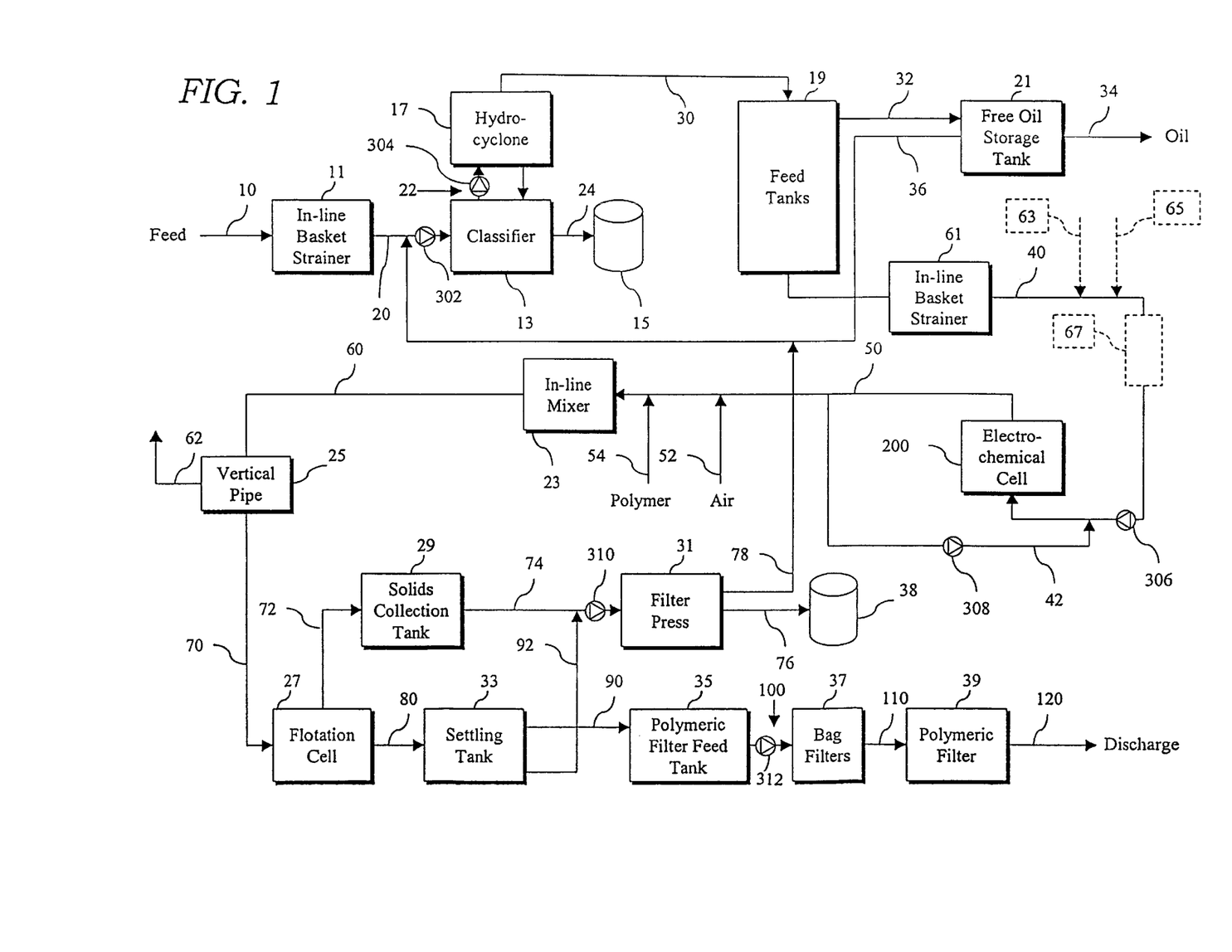
FIG. 1 is flow chart of the wastewater treatment process of the present invention.

Referring now to the drawings, in which like reference numbers represent similar or identical structures throughout, FIG. 1 illustrates the wastewater treatment process through the use of a simple flow diagram. The wastewater, containing varying amounts of contaminants, is fed into a strainer 11 in step 10 to remove larger debris. In this embodiment, which is exemplary of the system and process of the present invention, the contaminants consist primarily of petroleum hydrocarbons that are found, for example, in shipyard wastewater, including "bilge water." Other contaminants include larger debris that can be separated out initially through the use of strainer 11. Following the initial straining, the wastewater stream, free of the larger sized debris, is sent to a classifier 13 in step 20.

The classifier 13 is a large tank with an inlet located in an intermediate area of the tank that receives the wastewater stream from the strainer 11. The wastewater stream is pumped into the classifier 13 by means of a pump 302. A pump 304 is used to remove the wastewater from the classifier 13 and is located such that wastewater is pumped from the top region of the classifier 13. This causes flow of the wastewater from the classifier inlet upwardly to the top region of the classifier 13 where it is pumped out. Heavier particles in the incoming wastewater stream settle downwardly in the classifier by force of gravity to come to rest at the bottom of the classifier 13. An auger extends ry into the bottom of the classifier 13 to direct the heavy solids into a disposal container 15. When the auger is activated, the solids at the bottom of classifier 13 are moved upwardly and out of the auger into the disposal container 15 in step 24. The solids in the container 15 may be removed to a suitable solids disposal site such as a landfill.

The overlying liquid in the classifier 13 is pumped to a solid-liquid hydrocyclone 17 in step 22 by pump 304. The coarse solids that have not sunk to the bottom and that have entered the hydrocyclone 17 with the overlying liquid are returned to the classifier 13 for further separation, while the wastewater stream is sent to feed tanks 19 in step 30. The number and capacity of feed tanks 19 used in the system is dependent on the amount of wastewater stream throughput. When more than one feed tank 19 is necessary, they are aligned in a parallel configuration. Once in the feed tanks 19, the free oil in the wastewater rises to the top in the first decant to be removed by a surface skirmner. The free oil from the skimmer then flows by gravity to the free oil storage tank 21 in step 32 where it undergoes a second decant. The oil is pumped from the top of the free oil storage tank 21 in step 34 and is re-used for various applications. The wastewater underneath the oil (underflow) in the free oil storage tank 21 is returned to the classifier 13 in step 36.

The wastewater in the feed tanks 19, underneath the oil remaining after the first decant, is transported by pump 306 through an in-line basket strainer 61 to an electrochemical cell 200 in step 40. The wastewater is pumped to the bottom inlet 210 (FIG. 2) of the electrochemical cell 200, which will be described in more detail in reference to FIGS. 2 and 3, below. Inside the electrochemical cell 200, the wastewater is passed over electrically charged plates arranged to create a serpentine path for the wastewater. In a process of coagulation, the negatively charged contaminants in the wastewater form clusters or "flocs" with the positively charged ions being released by the charged plates. The clusters join with other clusters to form larger flocs that are easier to remove. In addition, the electrocoagulation process causes hydrolysis of the wastewater, releasing hydrogen gas and oxygen gas into the wastewater and forming hydroxyl ions. The oxygen acts to oxidize contaminants and the hydroxyl ions act to precipitate metals out of the wastewater. This process of electrocoagulation will be described in more detail below. The treated wastewater and gases exit from the top outlet 220 (FIG. 2) of the electrochemical cell 200 and are sent toward an in-line static mixer 23 in step 50. A portion of the wastewater that enters cell 200 is re-circulated through the electrochemical cell 200 in step 42 by pump 308 at a rate sufficient to provide turbulent mixing and scouring of the plates in cell 200. In the preferred embodiment and as an example only, with a flow rate of 10 gallons per minute to cell 200, a re-circulation flow rate of about 50 gallons per minute to 100 gallons per minute is acceptable.

Figure 2:
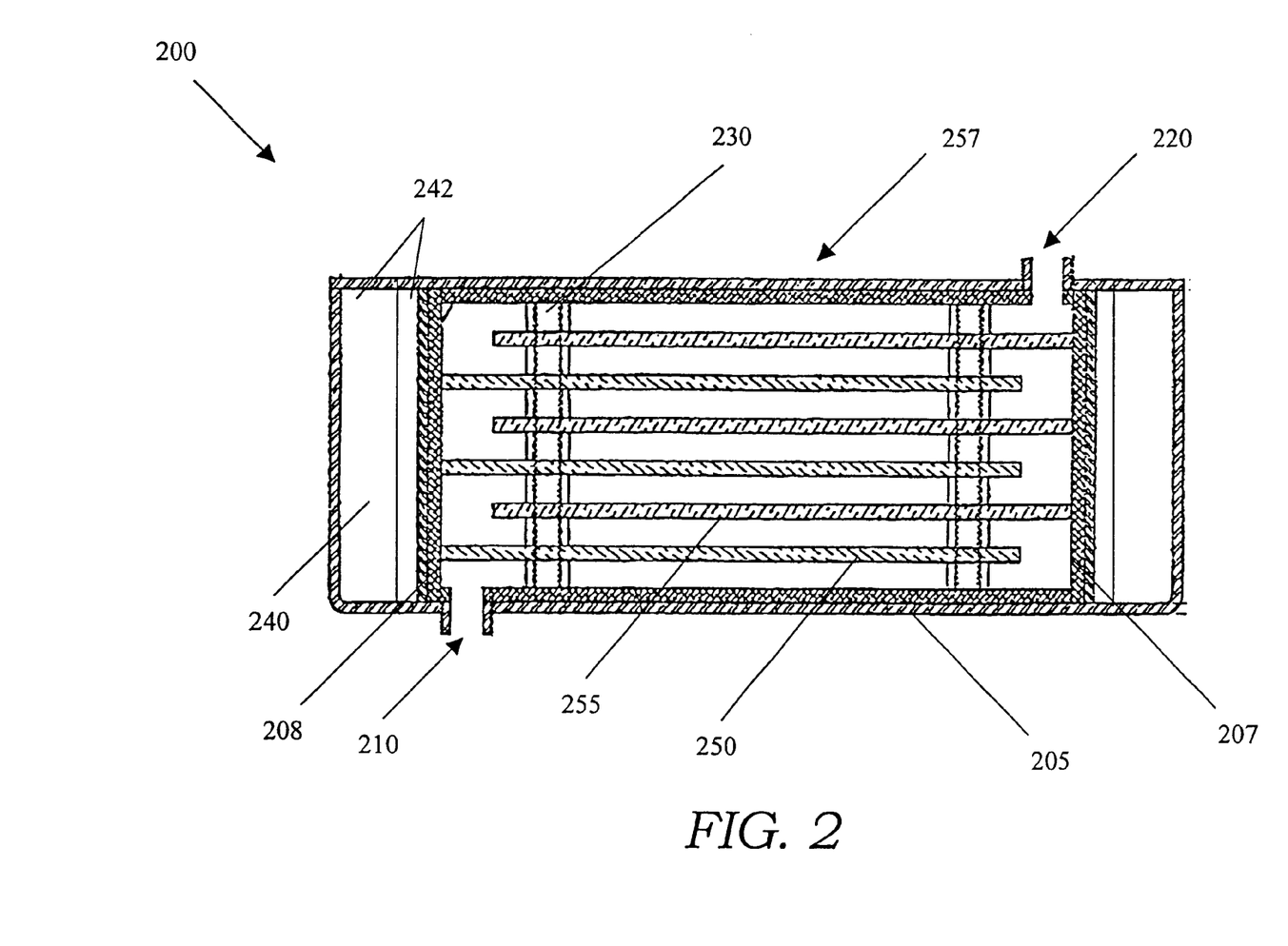
FIG. 2 is a side cross-sectional view of the electrochemical cell of the present invention.

After exiting outlet 220, the wastewater is injected with compressed air in step 52 and anionic polymer in step 54. The mixture is then introduced into the in-line static mixer 23, which mixes the polymer and air with the wastewater stream. Because the mixer is a static mixer and because compressed air (or other suitable gas) is used, the amount of mechanical sheer on the polymer and coagulated solids from cell 200 is limited, minimizing the breakup of the polymer and flocs. At the same time, the use of a static mixer with compressed air in the wastewater stream provides significant enhancement of the mixing of polymer with the wastewater stream. This enables the use of much lower amounts of polymer in the system generally, while still providing significant coagulation and separation of solids from the wastewater stream. The compressed air mixed into the wastewater stream by the in-line static mixer 23 facilitates the contact of polymer with the coagulated solids and creates flocs containing entrained gases. This results in easier separation of the flocs from the wastewater in the flotation cell 27. The negatively charged polymer combining with the positively charged flocs make larger diameter floes with lower overall densities, since larger sized flocs are more effective at accumulating gas bubbles on their surfaces and in their void spaces. As a result, the overall densities of the flocs are lower than the density of the wastewater, causing a portion of the flocs to rise to the surface and float. Later, when the gas bubbles escape from the floc, the overall density increases beyond that of the wastewater and a portion of the flocs sink.

The polymer and air can optionally be added to the wastewater stream before the electrochemical cell 200. In that case, the introduction of air promotes turbulence in the cell which promotes contact of the contaminants with the plates, thereby enhancing coagulation, and the introduction of anionic polymer acts to scavenge positively charged contaminants, forming embryonic flocs, also enhancing coagulation in the electrochemical cell 200. The addition of polymer and compressed air prior to the electrochemical cell 200 is useful as well where it is desired to remove positively charged ions from the wastewater. This procedure is described in more detail below with respect to an alternative embodiment of the present invention.

The mixture of polymer, wastewater and air leaving the in-line static mixer 23 flows past a vertical pipe 25 in step 60. The vertical pipe 25 allows the majority of gases to vent in step 62 so that the rise of flocculated particles in the flotation cell 27 is not disrupted by excessive turbulence due to escaping gases. After passing vertical pipe 25, the wastewater flows into a flotation cell 27 in step 70. In the flotation cell 27, the entrained gases associated with the coagulated solids still remaining in the wastewater result in a decreased density of the flocs, which is less than that of the wastewater, causing the flocs to rise to the surface of the wastewater in the flotation cell 27. The floating flocs flow over an overflow weir into a solids collection tank 29 in step 72. The solids in the solids collection tank 29 are pumped to a filter press 31 in step 74 by pump 310. The filter press 31 removes the water from the solids and returns the filtrate to the classifier 13 in step 78. The solids are removed from the filter press 31 after a pressure drop indicates that it is full. The solids are stored in a disposal container 38 in step 76 and may be removed to a suitable solids disposal site such as a landfill.

The underflow of the flotation cell 27, which is substantially free of flocs, flows by gravity to a settling tank 33 in step 80. In the settling tank 33, further separation of the coagulated solids can occur through gravity as the solids remaining in the underflow will generally have a density greater than the wastewater and will sink to the bottom. These solids are pumped to the filter press 31 in step 92 along with the flocs from the solids collection tank 29. The water, now substantially free of solids, leaves the settling tank 33 over an overflow weir where it enters into a polymeric filter feed tank 35 in step 90. This water is pumped to a plurality of in-line bag filters 37 in step 100 by pump 312, and finally to a polymeric filter 39 in step 110 where most of the residual contaminants are removed. This final discharge of water with substantially reduced contaminants is released into the ground or sewer in step 120.

The primary advantage this process enjoys over chemical systems is a significantly lower quantity of residuals for disposal, at lower cost and with better operational simplicity. The primary advantage of this process over physical systems is greatly improved contaminant removal from the wastewater. The only contaminants that require disposal are the concentrated solids in the disposal containers.

Figure 3:
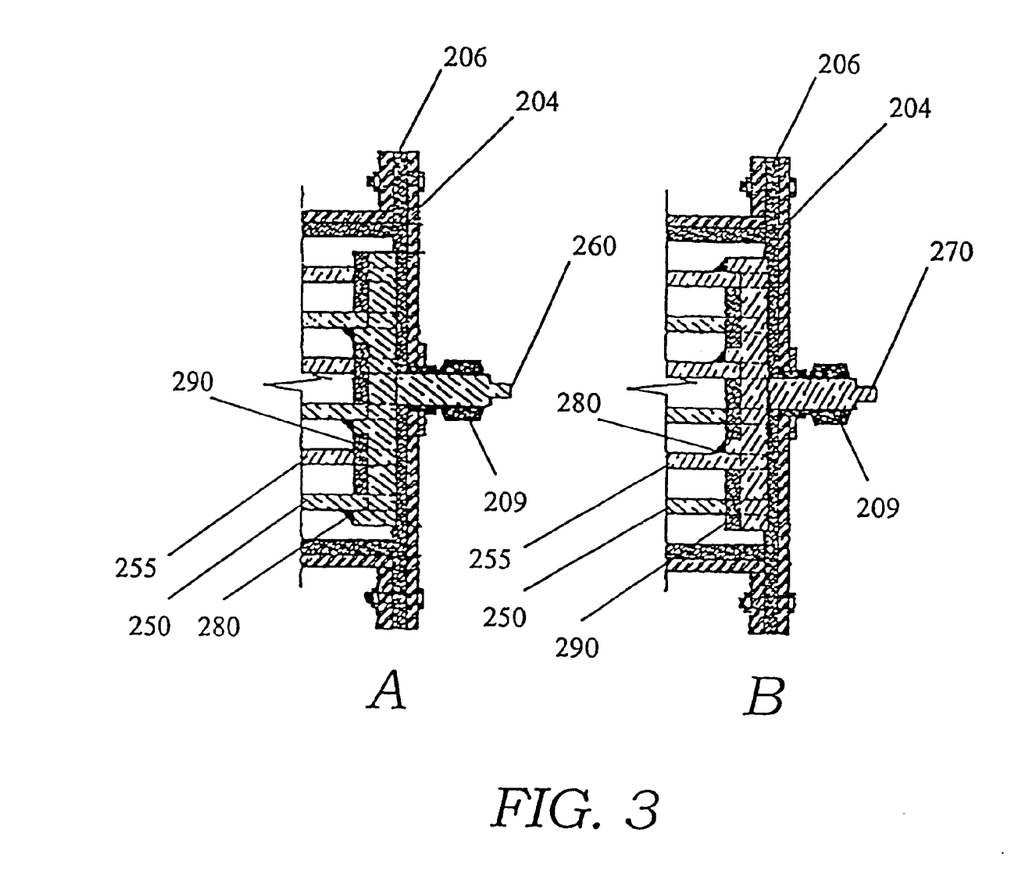
FIG. 3 is an end sectional view of the electrochemical cell of FIG. 2.

Referring now to FIGS. 2 and 3, the electrochemical cell 200 is illustrated. In FIG. 2, a cross-sectional view of the electrochemical cell 200 is shown as it would be viewed from the front of the device. The cell 200 is equipped with conductive plates 250 and 255 that are alternatingly connected to oppositely charged electrodes as will be explained in more detail in reference to FIG. 3 below. The plates 250 and 255 are evenly numbered so that there are an equal amount of anode and cathode conductive plates. In order to provide easy replacement of the plates 250 and 255, they are installed into the cell 200 in a cartridge 257. The cell housing 205 has a removable cover 204 to allow the interchanging of the cartridges 257. Further, the plates 250 and 255 are large in area and few in number, which permits lower pressure and voltage drops. The plates 250 and 255 are made of aluminum in the preferred embodiment but may be composed of any one of a number of materials based on the type of contaminants that are to be removed. For example, iron, platinum, carbon or titanium plates could be utilized. The plates 250 and 255 are separated by spacers 230 that are fabricated from non-conductive material such as nylon to maintain a plate spacing that in the preferred embodiment is approximately 0.5 inches. To achieve a seal at the end of the cartridge 257 and thus create a serpentine flow path, electrically insulated end plates 207 and 208 are used. The end plates 207 and 208 are held in compression against the cartridge 257 by mechanical means. The plates 250 and 255 are arranged in a manner that creates a serpentine flow path for the wastewater. This is done by leaving a gap between plates 250 and the end plate 207 on one end of the cartridge 257 and between plates 255 and the end plate 208 on the opposite end of the cartridge 257. The wastewater enters at the bottom inlet 210 and is pumped through the cell 200 to the top outlet 220. As the wastewater winds its way through the cell 200, the electric field that is generated when a voltage is applied to the plates 250 and 255 causes the dissolved and suspended solids within the wastewater to coagulate and form larger flocs. At the same time, gas bubbles are generated by the electrolysis of wastewater, causing the larger flocs to float. This entire process is referred to as electrocoagulation.

The most commonly used electrode plates are iron or aluminum because they give trivalent ions; most other cheap and easily accessible metals give only bivalent ions. Trivalent ions have a higher ability than bivalent ions to absorb onto particles in the wastewater because they have a higher charge density. In the preferred embodiment of the present invention, aluminum electrode plates are used.

The effectiveness of the release of the metal ions into the wastewater is crucial to the coagulation of the solids and to the capability of the process in removing impurities. The release of metal ions is dependent on several factors, including the amount of current sent through the conductive plates, the residence time that the wastewater is in contact with the plates, and the level of turbulence created by the flow of wastewater through the system. In addition, the release of metal ions must be balanced with the injection of polymer, with the goal being to run the lowest possible current but still release sufficient levels of metal ions to initiate coagulation of the contaminants in the wastewater. If the current is set a level that is too high, excessive metal ions are released, thereby increasing the consumption of the plates. When the consumption of the plates is increased, additional polymer is required to coagulate the excess metal ions, which increases the density of the flocs. Thus, it is important to find a current that is high enough to release the metal ions from the plates, but low enough to maintain an acceptable floc density.

The key parameters in designing and operating the cell are plate surface area, wastewater flow rate and current. With a cell having approximately 20 square meters of total plate surface area and with a flow rate of 50 liters per minute, we have found that a suitable current is in the range of 300 to 450 amperes. While the cell 200 has been operated using current less than 300 amperes and current exceeding 450 amperes, the preferred range has produced the desired results. Prior systems have had difficulty perfecting the residence time/turbulence conditions, that is, being able to increase turbulence while maintaining adequate residence time of the wastewater within the electrochemical cell. The present invention has solved this problem by introducing a re-circulation stream at step 42 back into the bottom of the electrochemical cell 200 which, in the preferred embodiment, re-introduces approximately 2 to 10 times the throughput rate of 10 gallons/minute. The re-circulation stream creates high turbulence in the cell 200, scouring the conductive plates 250 and 255 so that the contact of wastewater with the plate surface is increased. This can be further enhanced, if required, by introducing compressed air into the wastewater stream before it enters the cell 200.

The electrochemical cell 200 is constructed using stainless steel that is internally vulcanized so that it is not conductive. Alternatively, rubber lined carbon steel or other materials or composites that provide structural strength without conducting electricity could also be used. Wedges 242 are placed on both ends of the cell 200 in area 240, providing a seal at the ends of the plates to avoid bypassing of wastewater flow. The cell 200 also contains a removable cover 204 to permit access to the inside of the cell and for cartridge replacement as explained above. The cover 204 is electrically insulated from the cartridge 257 (plates 250 and 255 and spacers 230) by a non-conductive gasket 206 and from the electrical headers 260 and 270 by a non-conductive fitting 209 that also provides a water tight seal.

The cell 200 is also unique in its ability to manage the gas build-up associated with the process. By directing the flow of wastewater from the bottom 210 of the cell 200 to the top 220, as opposed to prior art, which directs the flow from side to side, there is no gas build-up and thus, no pockets of gas created to disrupt the process. The upward serpentine flow coupled with an outlet at the top of the cell allows gas to exit the cell without creating problems. Several benefits are realized by removing accumulated gases, including even plate consumption, turbulent mixing, consistent gas flow, low voltage requirements, and prevention of plate overheating.

FIG. 3 illustrates a partial side view of each of the electrical headers. In FIG. 3A, a first electrical header 260 is shown. The bottom or first plate 250 is welded onto the first header 260 by weld 280, as is every odd numbered plate (counting from the bottom, 3, 5, 7, etc.). The second plate 255 is electrically insulated from the header with insulation 290, as is every even numbered plate (2, 4, 6, etc.). In FIG. 3B, a second electrical header 270 is shown with the plate attachment reversed from the first electrical header 260. Thus, the first (bottom) plate 250 is electrically insulated from header 270 by insulation 290, while the second plate 255 is welded on to header 270 with weld 280. This configuration permits adjacent oppositely charged plates in parallel alignment to promote superior coagulation in the cell 200. The current sent to each header 260 and 270 is alternated in timed intervals to avoid the build-up of contaminants at either the anode or cathode. In the preferred embodiment, the polarity is alternated typically between 1 and 10 minutes.

The process utilizing the electrochemical cell 200 is ideally suited for removal of negatively charged suspended solids, including oils, clays, silt, chlorinated organics, bacteria, microorganisms and metals such as arsenic, molybdenum or chromium which are co-precipitated.

An alternative embodiment of the present invention is for water purification for potable water. Water purification for potable water would not require the steps prior to treatment in the electrochemical cell 200. The rest of the process and apparatus of this embodiment is the same as that described above with respect to the first embodiment.

The process described is also ideally suited for removal of positively charges suspended solids such as heavy metals, including copper, cadmium, nickel and zinc. This can be particularly useful, for example, in removing these contaminants from wastewater effluent of mining operations. In that case, and exemplary of an alternate embodiment of the present invention, polymer is injected into the wastewater prior to the wastewater entering the electrochemical cell 200, accompanying the addition of polymer into the wastewater after exiting the cell 200. This embodiment is depicted in FIG. 1 in dotted outline. The wastewater leaving strainer 61 is injected with an anionic polymer at step 63 and compressed air at step 65 in the same manner as described above with respect to steps 52 and 54. The order in which the compressed air and polymer are injected does not affect the operation of the process in any significant manner. The wastewater with the injected polymer and compressed air is then passed through an in-line static mixer 67, which may be identical to the in-line static mixer 23. The negatively charged polymer is attracted to the positively charged metals, forming negatively charged flocs with the metal ions. The mixture leaving the mixer 67 is then pumped into inlet 210 (FIG. 2) by pump 306 as previously described. Once in the electrochemical cell 200, the negatively charged flocs containing the metal ions are attracted to the positively charged metal ions released from the plates 250 and 255, forming even larger flocs. The negatively charged particles are coagulated in the electrochemical cell 200 as described above with respect to the first embodiment of the present invention, and further coagulation of all the flocs occurs upon injection of compressed air at step 52 and of polymer at step 54. The rest of the process of this embodiment is the same as that described above with respect to the first embodiment.

Having thus described preferred embodiments of a wastewater treatment system and process for contaminant removal, it will be apparent by those skilled in the art how certain advantages of the present invention have been achieved. It should also be appreciated that various modifications, adaptations, and alternative embodiments thereof may be made within the scope and spirit of the present invention. For example, the treatment of industrial wastewater has been illustrated, but it should be apparent that the inventive concepts described above would be equally applicable to an endless array of applications including ground water clean-up, storm water treatment, sewage treatment, preparation of potable water, mineral processing and mining water treatment. Moreover, the words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself. The definitions of the words or elements of the following claims are, therefore, defined in this specification to include not only the combination of elements which are literally set forth, but all equivalent structure, material or acts for performing substantially the same function in substantially the same way to obtain substantially the same result. The described embodiments are to be considered illustrative rather than restrictive. The invention is further defined by the following claims.

We claim:

1. A process for removing contaminants from a wastewater stream, comprising:
    (a) feeding the wastewater stream into an electrochemical cell comprising at least a pair of conductive plates stacked in parallel spaced relation, wherein electricity is passed into said conductive plates and through the wastewater stream to produce a coagulated stream;
    (b) injecting a coagulating reagent into the coagulated stream from the electrochemical cell and passing the coagulated stream to a mixer, wherein said mixer contacts precipitated solids present in the coagulated stream with said coagulating reagent to produce a reagent-mixed liquid;
    (c) passing the reagent-mixed liquid from said mixer past a vent and into a flotation cell where a flotation cell liquid is produced through the removal of a majority of coagulated particles from the reagent-mixed liquid.

2. The contaminant removal process of claim 1, further comprising a step of injecting compressed air into the coagulated stream from the electrochemical cell prior to passing the coagulated stream to the mixer.

3. The contaminant removal process of claim 2, further comprising a step of injecting compressed air into the wastewater stream before the wastewater stream is passed to said electrochemical cell.

4. The contaminant removal process of claim 2, wherein the flotation cell liquid is produced when coagulated particles rise to the surface due to buoyancy caused by the compressed air associated with the particles and are separated from the liquid at the surface.

5. The contaminant removal process of claim 1, further comprising a step of injecting compressed air into the wastewater stream before the wastewater stream is passed to said electrochemical cell.

6. The contaminant removal process of claim 1, further comprising a step of feeding the wastewater stream to a classifier prior to passing the wastewater stream to said electrochemical cell, wherein a classifier stream is produced by settling out larger particles from the wastewater stream to the bottom of the classifier.

7. The contaminant removal process of claim 6, further comprising a step of removing solids from said classifier.

8. The contaminant removal process of claim 7, wherein an auger is used to remove the solids from a bottom region of said classifier.

9. The contaminant removal process of claim 6, further comprising a step of passing the classifier stream to a solid/liquid hydrocyclone, wherein the heavier components of the wastewater stream are returned back to said classifier and the remaining wastewater stream is passed on to the electrochemical cell.

10. The contaminant removal process of claim 6, further comprising a step of passing the classifier stream to a feed tank, wherein a feed tank stream is produced.

11. The contaminant removal process of claim 10, wherein the feed tank stream has an oily component.

12. The contaminant removal process of claim 11, further comprising a step of skimming free oil from a top surface of the feed tank stream.

13. The contaminant removal process of claim 12, further comprising a step of sending the free oil to a storage tank and of decanting the free oil from said storage tank.

14. The contaminant removal process of claim 12, further comprising a step of passing liquid present underneath the free oil in said storage tank back to said classifier.

15. The contaminant removal process of claim 1, further comprising a step of removing large particulates from the wastewater stream prior to passing the wastewater stream to said electrochemical cell.

16. The contaminant removal process of claim 15, wherein the large particles are removed from the wastewater stream by a strainer.

17. The contaminant removal process of claim 1, further comprising a step of adding a second coagulating reagent to the wastewater stream before the wastewater stream is passed to said electrochemical cell.

18. The contaminant removal process of claim 17, wherein the second coagulating reagent is a polymer.

19. The contaminant removal process of claim 1, wherein said conductive plates are oriented horizontally.

20. The contaminant removal process of claim 1, further comprising a step of periodically reversing the polarity of said conductive plates.

21. The contaminant removal process of claim 1, wherein said conductive plates are aluminum or iron.

22. The contaminant removal process of claim 1, wherein each successive plate is sealed to an opposite end of a housing of said electrochemical cell and to both opposing side walls of said housing, creating a serpentine path for the wastewater stream to travel from an inlet at a bottom of said electrochemical cell to an outlet in a top of said electrochemical cell, wherein said electrochemical cell also includes a first and second electrical headers, wherein each of said conductive plates is in electrical communication with either said first or said second header.

23. The contaminant removal process of claim 22, wherein said conductive plates are aluminum or iron where the product of electrical current in amperes and the hydraulic residence time in minutes per electroplate surface area in square meters is greater than 20 amp minutes/square meter.

24. The contaminant removal process of claim 22, wherein a side cover of said housing is removable, allowing said conductive plates to be changed.

25. The contaminant removal process of claim 1, further comprising a step of re-circulating a portion of the coagulated stream through said electrochemical cell.

26. The contaminant removal process of claim 25, wherein the flow rate of said portion of the coagulated stream that is re-circulated to the electrochemical cell is sufficient to cause turbulent mixing of the wastewater with the metal ions released from the plates and sufficient to cause scouring of the plates.

27. The contaminant removal process of claim 1, wherein said coagulating reagent is a polymer.

28. The contaminant removal process of claim 1, wherein said coagulated particles present in said reagent-mixed liquid flow over an overflow weir into a solids collection tank.

29. The contaminant removal process of claim 28, further comprising a step of passing solids from said solids collection tank and said settling tank to a filter press, wherein liquid is removed from the solids and is sent to said classifier.

30. The contaminant removal process of claim 1, further comprising a step of passing the flotation cell liquid from said flotation cell to a settling tank where a substantially solid-free liquid is produced.

31. The contaminant removal process of claim 30, further comprising a step of passing the substantially solid-free liquid from the settling tank through at least one filter.

32. The contaminant removal process of claim 31, wherein said at least one filter includes one or both of a bag filter and a polymeric filter.

33. The contaminant removal process of claim 1, wherein the mixer is a static mixer.

34. The contaminant removal process of claim 33, wherein the static mixer is an in-line mixer.

35. A process for removing contaminants from a wastewater stream including an oily component, comprising:

(a) feeding the wastewater stream into a classifier;

(b) passing the wastewater stream from the classifier to a plurality of feed tanks where a feed tank stream is produced;

(c) skimming free oil from a top surface of the feed tank stream in said feed tanks and sending the free oil to a storage tank;

(d) decanting the free oil from said storage tank;

(e) passing liquid present underneath the free oil in said storage tank back to said classifier;

(f) passing the feed tank stream from said feed tanks to an electrochemical cell, having conductive plates stacked in parallel spaced relation such that each successive plate is sealed to an opposite end of a housing of said electrochemical cell and to both opposing side walls of said housing, creating a serpentine path for the feed tank stream to travel from an inlet at a bottom of said electrochemical cell to an outlet in a top of said electrochemical cell, wherein said electrochemical cell also includes a first and second electrical header, wherein each successive conductive plate is in electrical communication with either said first or said second header alternatingly, wherein electricity is passed into said conductive plates and through the feed tank stream to produce a coagulated stream;

(g) re-circulating a portion of the coagulated stream through said electrochemical cell, at a sufficient flow rate to cause turbulent mixing of the wastewater and the metal was released from the plates and to cause scouring of the plates;

(h) injecting compressed air and a coagulating reagent into the coagulated stream from the electrochemical cell and passing the coagulated stream to an in-line mixer, wherein said in-line mixer contacts precipitated solids present in the coagulated stream with said coagulating reagent to produce a reagent-mixed liquid;

(i) passing the reagent-mixed liquid from said in-line mixer past a venting apparatus and into a flotation cell where a flotation cell liquid is produced through the removal of a majority of coagulated particles from the reagent-mixed liquid, wherein said coagulated particles present in said reagent-mixed liquid flow over an overflow weir into a solids collection tank;

(j) passing the flotation cell liquid from said flotation cell to a settling tank where a substantially solid-free liquid is produced;

(k) passing solids from said solids collection tank and said settling tank to a filter press, wherein liquid is removed from the solids and is sent to said classifier; and (l) passing the substantially solid-free liquid from said settling tank through at least one filter to obtain a final discharge.

36. The contaminant removal process of claim 35, further comprising a step of removing large particulates from the wastewater stream prior to passing the wastewater stream to the classifier.

37. The contaminant removal process of claim 36, wherein the large particles are removed from the wastewater stream by an in-line basket strainer.

38. The contaminant removal process of claim 35, further comprising a step of removing solids from a bottom of said classifier.

39. The contaminant removal process of claim 38, wherein an auger is used to remove the solids from a bottom of said classifier.

40. The contaminant removal process of claim 35, further comprising a step of passing the wastewater stream from the classifier to a solid/liquid hydrocyclone, wherein the heavier components of the wastewater stream are returned back to said classifier and an oily liquid stream is passed to said feed tanks.

41. The contaminant removal process of claim 35, further comprising a step of injecting compressed air into the feed tank stream before it is passed to said electrochemical cell.

42. The contaminant removal process of claim 35, further comprising a step of adding a second coagulating reagent to the feed tank stream before the feed tank stream is passed to said electrochemical cell.

43. The contaminant removal process of claim 42, wherein the second coagulating reagent is a polymer.

44. The contaminant removal process of claim 35, wherein said conductive plates are oriented horizontally.

45. The contaminant removal process of claim 35, further comprising a step of periodically reversing the polarity of said conductive plates.

46. The contaminant removal process of claim 35, wherein said conductive plates are aluminum.

47. The contaminant removal process of claim 46, wherein the product of electrical current in amperes and the hydraulic residence time in minutes per electroplate surface area in square meters is greater than 20 amp minutes/square meter.

48. The contaminant removal process of claim 35, wherein a side cover of said housing is removable, allowing said conductive plates to be changed.

49. The contaminant removal process of claim 35, wherein the flow rate of said portion of the coagulated stream that is re-circulated to the electrochemical cell is sufficient to provide turbulent mixing and scouring of the conductive plates.

50. The contaminant removal process of claim 35, wherein said coagulating reagent is a polymer.

51. The contaminant removal process of claim 35, wherein said at least one filter includes one or both of a bag filter and a polymeric filter.

52. A wastewater treatment apparatus for a wastewater treatment system having an electrochemical cell for electro-coagulation of the wastewater, a flotation tank downstream of the cell for flotation separation of solids from the wastewater and a conduit connecting the cell to the flotation tank to direct wastewater from the cell to the tank, the treatment apparatus comprising:

(a) a reagent dispenser communicating with the conduit to dispense a coagulation-inducing reagent into the wastewater in the conduit; and (b) a mixer communicating with the wastewater in the conduit downstream from the point where the reagent is dispensed into the conduit, the mixer mixing the wastewater in the conduit with the reagent to cause coagulation of the solids in the wastewater and with gas in the wastewater to cause at least some of the solids in the wastewater to be directed upwardly to the surface due to the buoyancy force of the gas acting on the solids when the wastewater is in the flotation tank after discharge from the conduit.

53. The apparatus of claim 52, further comprising a compressed gas dispenser communicating with the conduit to dispense compressed gas into the wastewater in the conduit upstream of the mixer.

54. The apparatus of claim 52, wherein the reagent dispensed by the reagent dispenser is a coagulation-inducing polymer.

55. The apparatus of claim 52, wherein the mixer is housed within the conduit.

56. The apparatus of claim 55, wherein the mixer is an in-line static mixer.

57. The apparatus of claim 52, further comprising a vent positioned downstream of the mixer and communicating with the conduit to remove at least some of the gas from the conduit.

58. The apparatus of claim 52, wherein the compressed gas is air.

59. A wastewater treatment system for removing contaminants from wastewater, comprising:

(a) an electrochemical cell for electrocoagulation of contaminants in the wastewater, the cell comprising an inlet for directing wastewater into the cell and an outlet for directing wastewater from the cell and a pair of oppositely charged spaced conductive plates for directing the wastewater between the plates and for electrocoagulation of solids in the wastewater when electricity is passed into the plates;

(b) a flotation tank for flotation separation of solids from the wastewater;

(c) a first conduit connecting the outlet of the electrochemical cell with the flotation tank;

(d) a reagent dispenser for dispensing a coagulation-inducing reagent into the wastewater in the conduit;

(e) a compressed gas dispenser for dispensing compressed gas into the wastewater in the conduit; and (f) a mixer communicating with the wastewater in the conduit downstream from the point where the reagent and the compressed gas are dispensed into the conduit, the mixer mixing the wastewater in the conduit, travelling from the electrochemical cell, with the reagent to cause coagulation of solids in the wastewater, and with the compressed gas to cause at least some of the solids in the wastewater to be directed upwardly to the surface due to the buoyancy force of the gas acting on the solids when the wastewater is in the flotation tank after discharge from the conduit.

60. The system of claim 59, wherein the electrochemical cell comprises:

(a) a housing comprising a pair of opposed side walls and end walls connected together;

(b) a plurality of conductive plates stacked in parallel spaced relation such that each successive plate is sealed to an opposite end wall of the housing and to both opposing side walls of the housing, creating a serpentine path for the wastewater stream to travel from the inlet to the outlet past the plates; and (c) first and second electrical headers with each successive conductive plate in electrical communication with either the first or the second header alternatingly.

61. The system of claim 60, wherein the conductive plates are oriented horizontally.

62. The system of claim 60, wherein a side cover or end wall of said housing is removable, allowing said conductive plates to be changed.

63. The system of claim 59, further comprising a feed tank for storing wastewater prior to entering the cell, the feed tank connected to the inlet to direct wastewater from the feed tank to the cell.

64. The system of claim 63, further comprising an oil skimmer communicating with the feed tanks for skimming free oil from the surface of the wastewater in the feed tank.

65. The system of claim 64, further comprising a hydrocyclone for separating heavier components of the wastewater from lighter components of the wastewater, the hydrocyclone connected to the inlet such that the lighter components of the wastewater from the hydrocyclone are directed into the inlet.

66. The system of claim 65, further comprising a classifier for gravity settling of heavier components of the wastewater, the classifier connected to the hydrocyclone such that the heavier components of the wastewater from the hydrocyclone are directed to the classifier.

67. The system as described in claim 66, further comprising a strainer for removing large particulates from the wastewater prior to the wastewater entering the classifier.

68. The system of claim 66, wherein the classifier comprises an auger for removing solids settled from the wastewater in the classifier.

69. The system of claim 63, further comprising a hydrocyclone for separating heavier components of the wastewater from lighter components of the wastewater, the hydrocyclone connected to the feed tank such that the lighter components of the wastewater from the hydrocyclone are directed into the feed tank.

70. The system of claim 69, further comprising a conduit connected to the feed tank at one end and the hydrocyclone at the other end for directing flow of the lighter components of the wastewater from the hydrocyclone to the feed tank.

71. The system of claim 59, further comprising a strainer connected to the inlet for removing large particulates from the wastewater prior to the wastewater entering the inlet.

72. The system of claim 59, further comprising a vent positioned downstream of the mixer and communicating with the first conduit to remove at least some of the gas from the first conduit.

73. A The system of claim 59, further comprising a re-circulation conduit connected to the first conduit at one end and to the inlet at the other end, for directing a portion of the wastewater from the first conduit back to the inlet to be reintroduced into the cell.

74. The system of claim 73, further comprising a flow adjuster for adjusting the volume of wastewater flowing through the re-circulation conduit.

75. The system of claim 59, wherein the flotation tank comprises an overflow weir removing liquid and coagulated solids from the surface of the wastewater in the flotation tank.

76. The system of claim 75, further comprising a solids collection tank for collecting the coagulated solids and liquid from the overflow weir.

77. The system of claim 76, further comprising a filter press communicating with the solids collection tank to receive the coagulated solids and liquid in the solids collection tank and to filter the coagulated solids from the liquid.

78. The system of claim 77, further comprising a return conduit connected to the filter press at one end and the classifier at the other end for directing the liquid component of the coagulated solids and liquid passing through the filter press back to the classifier.

79. The system of claim 77, further comprising a settling tank connected to the flotation tank to receive the remaining wastewater following removal of the coagulated solids by the weir, the settling tank permitting the settling of particles in the remaining wastewater by gravity to the bottom of the settling tank.

80. The system of claim 79, further comprising a settling tank conduit connected to a bottom region of the settling tank at one end and to the filter press at the other end for directing solids and liquids in the bottom region of the settling tank to the filter press.

81. The system of claim 80, further comprising a filter connected to the settling tank to receive the wastewater in the settling tank remaining after removal of the solids and liquid from the bottom of the settling tank to remove substantially all the remaining particles from the wastewater leaving a final discharge of liquid flowing from the filter.

* * * * *